United States Patent [19]

Hsu et al.

[11] 4,180,243
[45] Dec. 25, 1979

[54] AUTOMATIC AND MANUAL LINEAR REVERSION CONTROL MECHANISM

[75] Inventors: William W. Hsu, Burbank; Robert McPherson, Valencia, both of Calif.

[73] Assignee: Textron Inc., Providence, R.I.

[21] Appl. No.: 732,266

[22] Filed: Oct. 14, 1976

[51] Int. Cl.² .................... F16K 31/44; G05G 11/00
[52] U.S. Cl. .................................. 251/234; 74/479; 74/522; 91/453; 251/279; 251/289
[58] Field of Search ............... 91/453, 367; 137/625.2; 251/235, 234, 289, 279, 280; 74/479, 480 R, 625, 522

[56] References Cited

U.S. PATENT DOCUMENTS

| | | | |
|---|---|---|---|
| 2,358,094 | 9/1944 | Panish | 74/479 |
| 2,704,947 | 3/1955 | Hopkins | 251/23 Y X |
| 2,863,500 | 12/1958 | Schumann | 251/23 Y X |
| 3,093,121 | 6/1963 | Murphy | 91/367 |
| 3,286,544 | 11/1966 | Gilmore et al. | 74/479 X |
| 3,526,152 | 9/1970 | Farrington et al. | 74/479 |
| 3,726,186 | 4/1973 | Wheeler et al. | 91/413 |

Primary Examiner—Irwin C. Cohen
Attorney, Agent, or Firm—Nilsson, Robbins, Dalgarn, Berliner, Carson & Wurst

[57] ABSTRACT

An automatic and manual linear reversion control mechanism for a hydraulic servo actuator assembly is disclosed for linearly transferring control between an automatic (fly by wire) control mechanism and a manual control mechanism. A command select mechanism includes two axially aligned pins mounted on a rigid command selector bar, with the first pins slidably mounted in a slot in a control bar of the manual control mechanism and the second pin slidably mounted in a slot in the control bar of the automatic control mechanism so that movement of the command selector bar to displace the two axially aligned pins in their associated slots provides a linear transfer of control of the hydraulic assembly between the manual control and the automatic control.

5 Claims, 4 Drawing Figures

AUTOMATIC AND MANUAL LINEAR REVERSION CONTROL MECHANISM

BACKGROUND OF THE INVENTION

The present invention relates to an automatic and manual linear reversion control mechanism for a hydraulic servo actuator and more particularly to a device for transferring control linearly between the automatic (fly by wire) control and the manual control.

Hydraulic control mechanisms typically include a main control valve for controlling the flow of fluid from a source to an actuator through either one of two ports and from the actuator to the source through a return conduit. The actuator position is fed back through an actuator feed back linkage to the main control valve to provide the desired control information.

In hydraulic control systems used for aircraft and other vehicle navigation, a manual control mechanism and an automatic control mechanism are typically provided to control the position of the control valve. Thus the position of the main control valve is controlled by the automatic control and the manual control as well as by the actuator feed back to thereby control the flow of fluid through the control valve and ultimately the position of the load connected to the actuator.

Various prior art devices have sought to transfer control between the automatic control and the manual control in a smooth manner. However, such devices include complicated linkage and joint arrangements and have a dead band of operation during the transfer between the manual and automatic controls. The backlash and friction in the transfer between the automatic and manual controls in such devices therefore renders the transfer between manual and automatic command rather awkward. The best prior art known to applicant is illustrated in U.S. Pat. Nos. 1,199,036; 1,119,324; 3,093,121 and 3,726,186.

SUMMARY OF THE INVENTION

The present invention provides transfer of authority between the manual and automatic controls linearly and avoids a dead band between the two domain's of control.

To attain this, the present invention provides a command select mechanism 10 having a selector carrier 18 with two axially aligned pins 16–17 mounted on opposite sides of the carrier 18 with one pin 16 associated with the manual control 11 and the second pin 17 associated with the automatic control 12. The first pin 16 is slidably mounted in a slot 26 in a control arm 24 of the manual control mechanism 11 and the second pin 17 is slidably mounted in a slot 31 in the control arm 29 of the automatic control mechanism 12. The two slots 29-31 are positioned with respect to each other so that movement of the command selector carrier 18, and correspondingly the two pins 16–17 in their associated slots provides a linear transfer of control of the entire hydraulic assembly between the manual control mechanism 11 and the automatic control mechansim 12.

Thus, the linear transfer between automatic and manual control mechanism enables a pilot using the system to place the system either completely under the command of the manual control mechanism, completely under the command of the automatic control mechanism or position it linearly between zero to 100% control under the manual control and 100% to zero control under the automatic control. The present invention achieves this using a mechanism which is extremely simplified over similarly employed prior art devices. Furthermore, the invention eliminates backlash and greatly reduces friction in transferring control between the manual and automatic control.

BRIEF DESCRIPTION OF THE DRAWINGS

FIG. 4B showing the system partially under manual and partially under automatic control; and FIG. 4C completely under manual control.

DESCRIPTION OF THE PREFERRED EMBODIMENT

Figure 1:
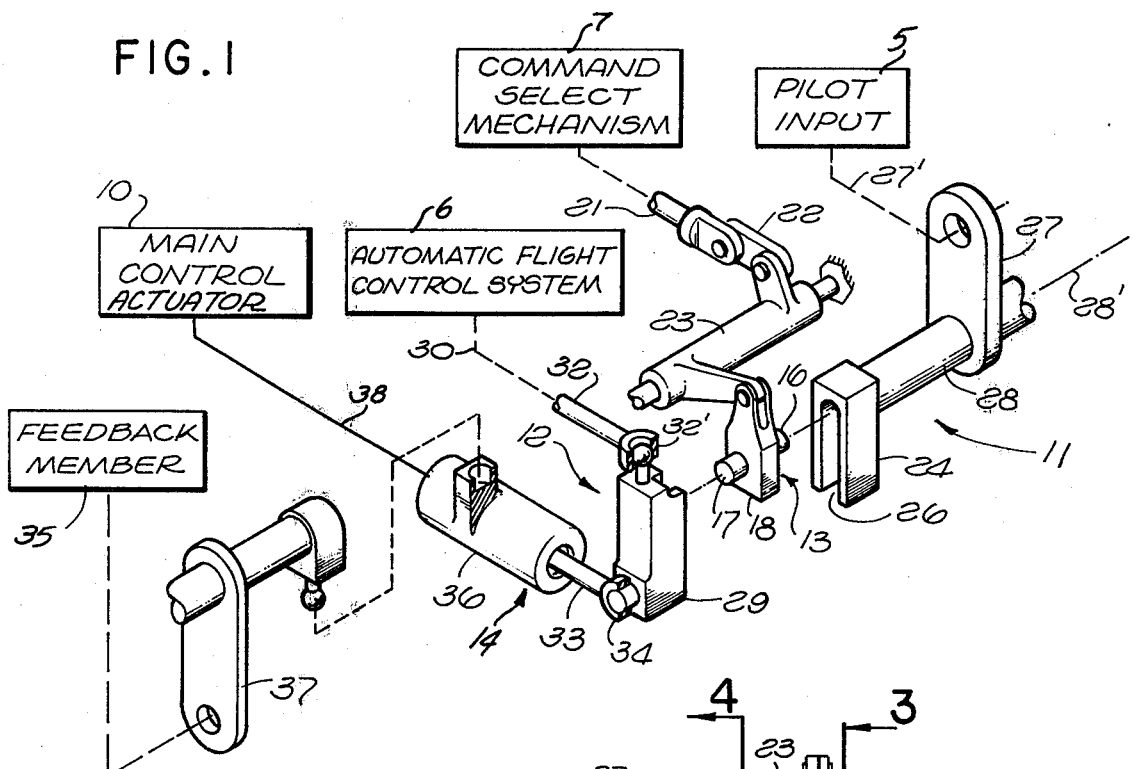
FIG. 1 is an exploded perspective view of the automatic and manual control mechanism of the present invention adopted for controlling a hydraulic servo actuator.
Figure 2:
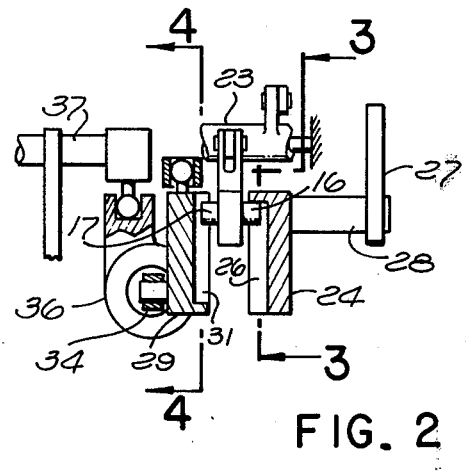
FIG. 2 is a view of the command selector mechanism of the present invention.

A linear control transfer mechanism constructed in accordance with the principles of the present invention is illustrated schematically in FIG. 1. As is therein shown a command select mechanism 7 may be positioned to place a selector means 13 in a position such that the main control valve 14 receives command information solely from pilot input 5 (manual control) or solely from the automatic flight control system 6 (fly by wire). Obviously the selector means 13 may be positioned intermediate these extremes to permit control partially by pilot input and partially by automatic input. An important feature of the present invention is the smooth linear transfer of control between manual and automatic which may be accomplished with a single mechanism.

As is shown in FIG. 1, the mechanism for transferring control of an actuator such as a hydraulic main control actuator 10 includes a main control valve 14 having a sleeve 26 and a piston rod 33 between manual control and automatic control includes a manual input control means 11 and an automatic input control means 12. A selector means 13 is coupled to both the manual input control means 11 and the automatic input control means 12 and is moveable to provide linear transfer of control of the actuator 10 between the manual input control means 11 and the automatic input control means 12 by a command select mechanism 7.

The selector mechanism 13 includes pin means such as axially aligned pins 16 and 17 which are cylindrical in shape and mounted on opposite sides of a rigid carrier member 18. The pin 16 is associated with the manual control means 11 and the pin 17 is associated with the automatic control means 12. A command select signal from the command select mechanism 7 is applied to the rod 21 and is transmitted through a pivotally secured linkage element 22 to a crank 23. It will be noted that the crank 23 is secured to prevent movement other than rotation. As the crank 23 rotates responsive to the command select signal the carrier 18, which is pivotally secured to the crank 23, is moved thereby placing the pins 16-17 in the desired position.

The manual control means 11 includes a crank 28 pivoted about the axis 28' and having arms 24 and 27 extending in opposite directions therefrom. The arm 27 is coupled to the pilot input 5 as indicated by the dashed line 27' and thus receives manual input signals therefrom. The arm 24 defines a slot 26 therein which receives the pin 16. As will be now recognized as the arm 27 moves responsive to manual input signals from the pilot input 7 the arm 24 in turn moves. Movement of the arm 24 may or may not tend to move the pin 16 depending upon its position in the slot 26. For example, if the pin is positioned on the axis 28', then it remains stationary while the arm 24 pivots around the axis 28'. Alternatively, if the pin 16 is positioned at the opposite end of the slot 26, then the pin 16 has force transmitted to it by the arm 24 as will be more fully discussed below.

The automatic input control means 12 includes a rigid arm 29 defining a slot 31 therein adapted to receive the pin 17. The rigid arm 29 is coupled at one end thereof through the ball and socket joint 32' to a rod 32 which in turn is coupled to the automatic flight control system 6 as indicated by the dashed line 30. At its opposite end, the arm 29 is coupled through the pivotal joint 34 to the piston rod 33 of the main control valve 14. Thus as input control signals are generated by the automatic flight control system 6 the arm 29 pivots about the pin 17 responsive thereto. Depending upon where the pin 17 is positioned in the slot 31, the signals from the automatic flight control system 6 will have from zero to full control over the main control valve 14.

A standard feedback mechanism well known to the art is provided including a feedback member 35 which is coupled through a suitable feedback linkage 37 to the sleeve 36 of the main control valve 14 to provide the feedback for the control mechanism in a manner well known in the art.

Figure 3:
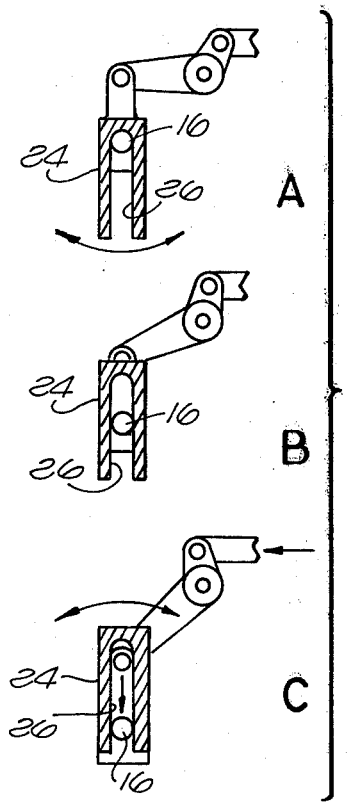
FIGS. 3A, 3B and 3C are cross-sectional views of FIG. 2 taken along the plane 3—3 showing the system completely in automatic control in FIG. 3A; partially on manual and partially on automatic control in FIG. 3B; and completely under manual control in FIG. 3C.
Figure 4:
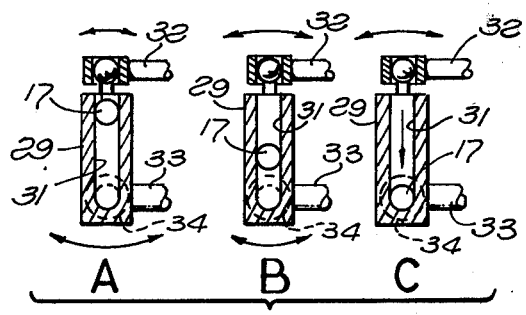
FIGS. 4A, 4B and 4C are cross-sectional views of FIG. 2 taken from along the plane 4—4 with FIG. 4A showing the system entirely under automatic control.

The selector means 13 is shown with the carrier 18 arranged so that pin 16 is at the upper end of the slot 26 as shown in FIGS. 1, 2, 3A and 4A. Under these circumstances, a manual input control signal from the pilot input 5 causes the arm 24 to rotate around the center axis of the pin 16 without pivoting the rigid carrier 18. As a result the manual input signal is not coupled to the control valve 14 and the actuator is entirely under automatic control. The pin 17 is at the upper end of the slot 31, as shown in FIG. 4A, and the arm 29 rotates around the pin 17 in response to an input signal applied from the automatic flight control system 6 to the automatic input control means 12. This signal is transmitted through the rod member 32 to cause the arm 29 to pivot around the pin 17 to cause the rod member 33 to displace a piston in the main control valve 14 to control the hydraulic actuator 10. As is obvious to those skilled in the art the main control valve effects actuator 10 control through the flow of fluid under pressure from a source (not shown) between the valve 14 and the actuator 10 as is illustrated by the line 38.

The control may be transferred between automatic control and manual control by moving the pins 16 and 17 between the upper and the lower ends of their respective associated slots 26 and 31. The movement of pins 16 and 17 may be achieved by displacing the linkage member 22 and the crank 23 to move the carrier 18 on which the pins 16 and 17 are mounted. As shown in FIGS. 3B and 4B, the command selector mechanism 13 is moved so that the pins 16 and 17 are partially displaced between the upper limits and the lower limits along their respective associated slots 26 and 31. Under such circumstances, the manual input control signal applied to arm 27 rotates the crank 28 to rotate the arm 24 to pivot the carrier 18 of the selector means 13 which in turn provides a force to the piston roll 33 of the control valve 14. The hydraulic main control actuator 10 is thereby partially controlled by the manual input control means.

Simultaneously, the automatic input control means 12 applies a control signal to rod 32 to rotate the arm 29 around pin 17 to also apply a force through the connection 34 to the rod member 33 to control the piston in the main control valve 14 to thus position the actuator 10. Thus, the actuator 10 is partially controlled by both the manual input control means 11 and the automatic input control means 12.

The actuator 10 may be completely controlled by the manual input control means 11 by displacing the command select mechanism carrier 18 so that the pins 16 and 17 are at the lower portions of their associated slots 26 and 31 as shown in FIGS. 3C and 4C. Under such circumstances, a manual input control signal from the pilot input 5 to the arm 27 rotates the crank 28 to rotate the arm 24 to pivot the carrier 18 of the selector mechanism 13. This causes the arm 20 to displace the rod 33 coupled to the piston of the main control valve 14 to thereby provide control entirely by the manual input control means 11. The location of the pin 17 at the bottom of the slot 31 prevents any movement of the rod 32 from controlling the movement of the rod 33 thereby disengaging the automatic control 12 completely.

Thus control of the hydraulic actuator 10 may thereby be transferred between the manual input control 11 and the automatic input control 12 by displacing the command selector mechanism 13 to thereby move and position the carrier 18 which is part of the command selector mechanism 13 a predetermined distance between the upper limits of the slots 26 and 31 and the lower limits of the slots 26 and 31 to transfer control linearly between the manual input control 11 and the automatic input control 12. The positioning of the carrier 18 of the command selector mechanism 13 transfers control linearly between 100% automatic control and 0% manual control when the pins 16 and 17 are in the upper portions of their associated slots 26 and 31 to 0% automatic control and 100% manual control when the pins 16 and 17 are in the lower portions of their respective associated slots 26 and 31.

The transfer of control is linear with respect to the displacement of the pins and their associated slots. Thus, the movement of the pin 16 from the top of the slot 26 to the bottom of the slot 26 causes a linear increase in manual control from 0% to 100% with respect to the displacement of pin 16 in slot 26. Correspondingly, the movement of the pin 17 from the top of the slot 31 to the bottom of the slot 31 causes a simultaneous linear decrease from 100% to 0% of the automatic control with respect to the linear displacement of the pin 17 in the slot 31.

It is therefore apparent that the present invention avoids any dead band in the transfer of control between automatic and manual control by transferring control linearly.

Obviously, many modifications and variations of the present invention are possible in light of the above teachings. It is therefore to be understood that within the scope of the appended claims, the invention can be practiced otherwise than as specifically described.

We claim:

1. A mechanism for linearly transferring the control over an apparatus connected to said mechanism between manual control and automatic control comprising:

manual input means for providing a manual input signal, to said mechanism;

automatic input means for providing an automatic input signal to said mechanism;

selector means having first and second limit positions including pin means slidably connected to both said manual input means and said automatic input means via linear transfer coupling means; and means for shifting said pin means between said first and second limit positions to provide linear transfer of control over said apparatus from being totally controlled by said manual input means when said selector means is in said first limit position and totally controlled by said automatic input means when said selector means is in said second limit position and controlled partially by each of said manual and automatic input means when said selector means is in any position other than said limit positions.

2. The mechanism as described in claim 1 wherein said pin means includes two pins, means coupling the first pin of said two pins to said manual input means, and means coupling the second pin of said two pins to said automatic input means.

3. The mechanism as described in claim 2 wherein said manual input means includes an arm having a first slot with said first pin being slidably mounted in said first slot and said automatic input means includes a second arm having a second slot with said second pin slidably mounted in said second slot with the displacement of said first and second pins to their limit positions in their associated respective slots being operative to transfer control over said apparatus between said manual input means and said automatic input means, said slots defining said linear transfer coupling means.

4. The mechanism as described in claim 3 which further includes a control valve having a sleeve and a piston rod and wherein said selector means includes a carrier member on which said first and second pins are mounted with said first arm adapted to pivot said carrier member in response to a manual input signal and said second arm being adapted to pivot around said second pin in response to an automatic input signal, said second arm being coupled to said piston rod.

5. The mechanism as described in claim 3 wherein said first and second pins are cylindrical in shape and aligned axially, said first and second arms each having a pair of side walls defining said slot therein, said first pin being slidably mounted between said walls of said first slot to be displaced a predetermined distance within said slot to transfer control over said apparatus linearly with respect to said predetermined distance between 100% manual control and 0% manual control and said second pin being slidably mounted between said side walls of said second slot to be displaced an equal predetermined distance to transfer control linearly with respect to said predetermined distance between 0% automatic control and 100% automatic control.

* * * * *